UNITED STATES PATENT OFFICE.

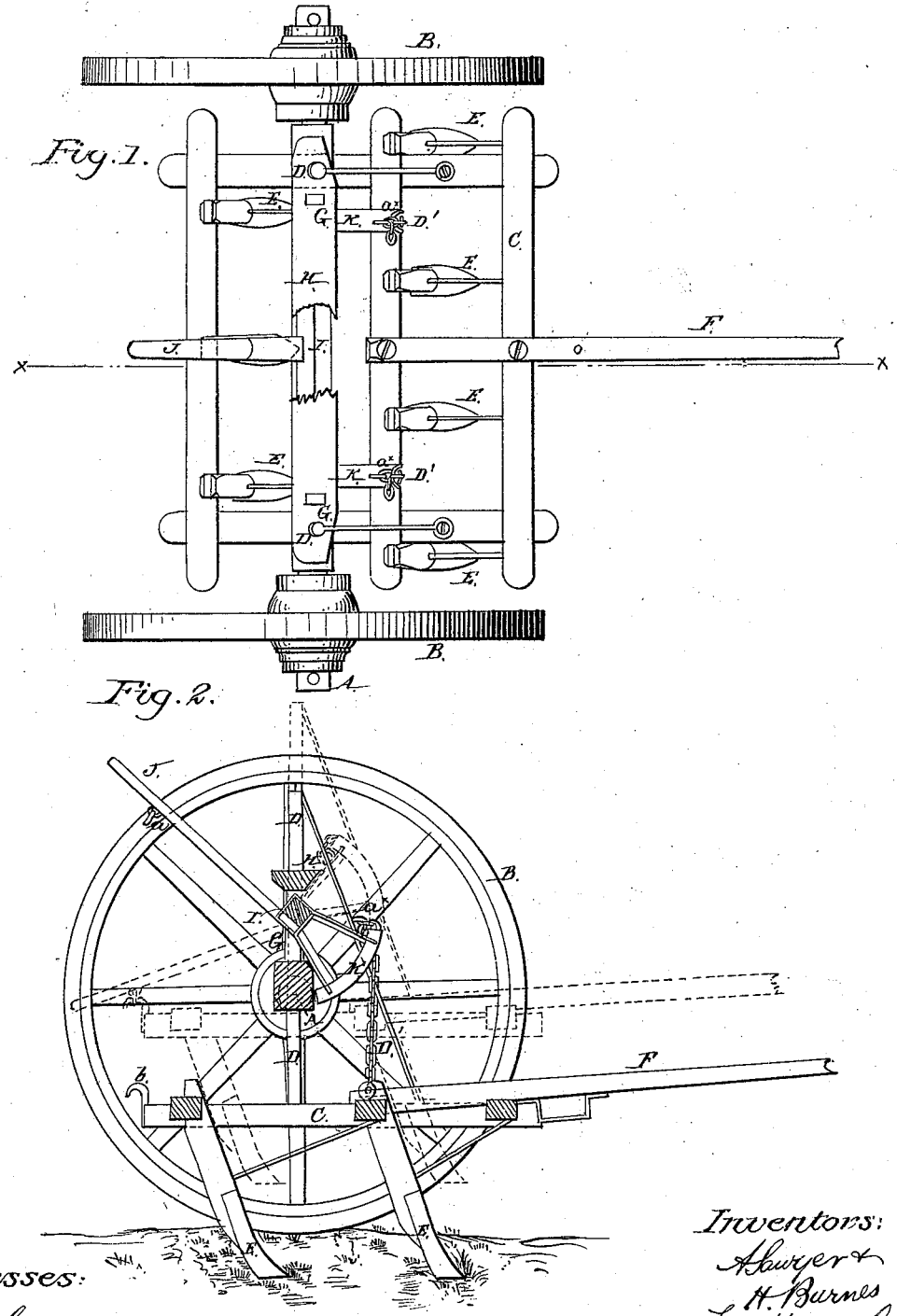

ANDREW SAWYER AND HENRY BARNES, OF BURLINGTON, WISCONSIN.

IMPROVEMENT IN CULTIVATORS.

Specification forming part of Letters Patent No. 34,528, dated February 25, 1862.

*To all whom it may concern:*

Be it known that we, ANDREW SAWYER and HENRY BARNES, both of Burlington, in the county of Racine and State of Wisconsin, have invented a new and Improved Cultivator; and we do hereby declare that the following is a full, clear, and exact description of the same, reference being had to the annexed drawings, making a part of this specification, in which—

Figure 1 is a plan or top view of our invention. Fig. 2 is a side sectional view of the same, taken in the line $x\ x$, Fig. 1.

Similar letters of reference indicate corresponding parts in the two figures.

To enable those skilled in the art to fully understand and construct our invention, we will proceed to describe it.

A represents an axle, the wheels B B of which may be of any suitable diameter; and C is a rectangular frame, which has a vertical rod, D, attached to each side of it, said rods passing loosely up through the axle A. The frame C has a series of teeth or shares, E, secured to it of any proper form, and to the frame C the draft-pole F is attached.

G G are two uprights, which are secured to the axle A, and are connected at their upper ends by a cross-piece, H. The ends of the cross-piece H project beyond the uprights G G, and the rods D D of the frame C pass through it.

I is a rock-shaft, the journals $a\ a$ of which are fitted and work freely in the uprights G G. The rock-shaft I has a lever, J, attached to it at right angles, and at each end of the rock-shaft there is secured a segment, K. These segments are of metal, and the frame C is connected to them by means of chains D′ D′. The lever J of the shaft I has a link, $a$, attached to it, and this link may be fitted on a hook, $b$, at the back of the frame C when it is necessary to have the frame C sufficiently elevated for the teeth or shares E to be above the surface of the ground.

It will be seen from the above description that by depressing the lever J the frame C will be elevated, and that when the lever J is fully depressed and secured by the link $a$ being fitted on the hook $b$ the frame C will be fully elevated, as shown in red outline in Fig. 2. It will also be seen that by lengthening or shortening the chains D′ D′ the teeth or shares E may be made to penetrate the earth at a greater or less depth, for the segments K K, when at their lowest point, rest or bear upon the axle A; and hence by varying the length of the chains aforesaid (which may be readily done by placing different links of the chains on hooks $a^*$ at the upper parts of the segments) the teeth or shares may be adjusted to penetrate any desired depth into the soil.

The whole arrangement is extremely simple and efficient, and possesses this advantage—to wit, the attaching of the draft-pole direct to the tooth or share frame C, whereby the draft is made more direct and far lighter than usual and the machine placed under much better control, the shares being free from all lateral play or vibration, which invariably attends in a greater or less degree all suspended toothed cultivator frames that we have seen. Our arrangement also admits of the frame C being applied to the axle of any ordinary wagon, so that the frame C, with its guide-rods D, segments, and chains, are all that is necessary for a farmer to purchase.

Having thus described our invention, what we claim as new, and desire to secure by Letters Patent, is—

The arrangement of the pendulous suspended frame C, attached draft-pole F, shares E, rods D, and chains D′ D′ with the segments K K, rock-shaft I, and lever J, in the manner herein shown and described.

ANDREW SAWYER.
HENRY BARNES.

Witnesses:
EDSON SHELDON,
H. A. SHELDON.